United States Patent
Schneiderwind

(10) Patent No.: US 8,038,437 B2
(45) Date of Patent: Oct. 18, 2011

(54) METHOD AND DEVICE FOR HEAT TREATMENT OF WOODEN STAVES DESIGNED TO FORM AROMATIC INSERTS

(75) Inventor: Jacques Schneiderwind, Coullons (FR)

(73) Assignee: Hedonis, Coullons (FR)

( * ) Notice: Subject to any disclaimer, the term of this patent is extended or adjusted under 35 U.S.C. 154(b) by 1198 days.

(21) Appl. No.: 11/662,076

(22) PCT Filed: Sep. 8, 2005

(86) PCT No.: PCT/FR2005/002239
§ 371 (c)(1),
(2), (4) Date: May 7, 2007

(87) PCT Pub. No.: WO2006/030115
PCT Pub. Date: Mar. 23, 2006

(65) Prior Publication Data
US 2007/0259299 A1     Nov. 8, 2007

(30) Foreign Application Priority Data
Sep. 9, 2004   (FR) ..................... 04 09547

(51) Int. Cl.
*F26B 25/06*   (2006.01)

(52) U.S. Cl. ................ 432/9; 432/55; 432/266; 34/104; 34/105

(58) Field of Classification Search ............... 432/9, 55, 432/266; 34/104, 105
See application file for complete search history.

(56) References Cited

U.S. PATENT DOCUMENTS

| | | | |
|---|---|---|---|
| 783,819 A * | 2/1905 | Chambers | 432/224 |
| 2,507,685 A * | 5/1950 | Wilde | 219/200 |
| 7,179,082 B2 * | 2/2007 | Salas et al. | 432/9 |
| 2004/0191383 A1 | 9/2004 | Salas et al. | |

FOREIGN PATENT DOCUMENTS

EP   1408104   * 4/2004

* cited by examiner

*Primary Examiner* — Leszek Kiliman
(74) *Attorney, Agent, or Firm* — Young & Thompson

(57) ABSTRACT

Method for treating wooden staves (5) designed to be subsequently contacted with an alcoholic medium such as wine, so as to provide same with aromas and flavours. The method includes the following steps: lining, at least partly, the inner side of a metal support (2) with the wooden staves (5); performing a thermal treatment of the wooden staves (5) using a cresset (7) arranged at the center of the support (2).

8 Claims, 3 Drawing Sheets

METHOD AND DEVICE FOR HEAT TREATMENT OF WOODEN STAVES DESIGNED TO FORM AROMATIC INSERTS

The present invention relates to a method and a device for heat treatment of wooden staves, or aromatic inserts, intended to be immersed in wine-making tanks, so as to provide their contents with certain specific aromas and flavors.

It is known that staves forming the barrels intended to contain wine, undergo during their manufacturing method, a treatment called toasting, consisting of submitting their inner face to strong heat in order to achieve a transformation of the structure of the wood with which, without achieving burning, aromas and flavors contained in the latter may be released in contact with the wine.

Achieving this same type of treatment by resorting to pieces of wood which are heated beforehand and which are then immersed in wine, in which it is desired to release the aromas and flavors contained in these treated woods, has been proposed. Thus various methods for treating wood such as toasting, roasting, ovening, etc. are thereby known, these different methods all have the drawback of uniformly treating the wood in its bulk.

One of the objects of the present invention is to propose a treatment method generating a heat effect which is gradual in the thickness of the wood and homogenous at the surface of the latter, such as this is the case for a barrel after it has undergone its second heating.

A difficulty which is inherent to treating wood by heat, is that the effect of the latter is very difficult to dose if it is desired not to give the wine an artificial color and aroma but on the contrary impart to the latter organoleptic properties in any point identical with those obtained when one proceeds with storing it in conventional type barrels, notably in oak.

The object of the present invention is to propose a method and a device with which a treatment of such wooden parts may be achieved, both of which may be easily applied industrially while retaining the quality and the advantages provided by the traditional conventional treatment applied in the field of barrel making. Thus, with the method and the device according to the invention, it is possible to reproduce the same effects as traditional techniques, notably as regards the nature of the fuel used, the quality of the radiations emitted during the heating as well as their mode of distribution over the wooden staves.

The object of the present invention is thus a method for treating wooden staves intended to be subsequently put into contact with an alcoholic medium such as notably wine, in order to provide the latter with aromas and flavors, characterized in that it includes the steps:

lining, at least partly, the inner side of a metal support with said wooden staves, performing heat treatment of the wooden staves by means of a cresset arranged at the centre of this support.

Preferentially, heating of the cresset will be provided by wood and, preferentially, by a wood of the same oil as the one to be treated. Thus, for heating, the shavings and waste resulting from the making of the staves may be thereby used, which is interesting both with regard to the quality of the obtained results and to the savings made.

According to the invention, the treating of the wooden staves may comprise two phases, corresponding to bottom-to-top inverted positions of the staves and/or to front-to-back inverted positions of the latter.

Interestingly, the temperature reached by the face of the staves exposed to the heat of the cresset may be measured by measuring the temperature of the face of opposite to the latter, notably by means of an infrared beam measuring device.

The object of the present invention is also a device for treating wooden staves intended to be put subsequently into contact with an alcoholic medium such as notably wine, in order to provide the latter with aromas and flavors, characterized in that it consists of a metal support capable of vertically holding the staves following a cylindrical distribution with axis yy', which is opened at least partly at its upper and lower portions and in the centre of which a cresset is positioned, the fuel of which consists of wood.

According to the invention, the means capable of holding the staves will be such that the middle plane of each of the latter will substantially pass through said yy' axis.

The cresset may consist of a metal tubular member pierced on its periphery with a series of ports inside which combustible items will be placed consisting of wood waste and notably of wood of the same nature as the one forming the staves to be treated. The cresset will be such that it will extend over a height equal to about two thirds of that of the metal support. Moreover, its diameter will be equal to about one third of the inner diameter of the latter.

According to the invention, metal bars which, in certain areas, will come into contact with the surface of the tubular member, will be positioned at the centre of the tubular member forming the shell of the cresset. These metal bars play a role in distributing heat and allowing the latter to be conveyed from the centre of the cresset towards the periphery of its shell, with which controlled distribution of the heat delivered by the cresset may be created over the whole height of the latter.

The object of the present invention is also an installation for automated treatments of wooden staves by means of devices as described earlier, which are positioned along a circle at the centre of which an arm is rotatably mounted, at least one end of which is provided with means for grasping the device with which lifting and turning over of the support may both be provided. Preferentially, both ends of the arm are provided with grasping means, with which rotations of the latter may be limited in order to perform a determined function.

An embodiment of the present invention will be described hereafter as a non-limiting example, with reference to the appended drawing wherein.

Figures 5A, 5B, 5C, 6:
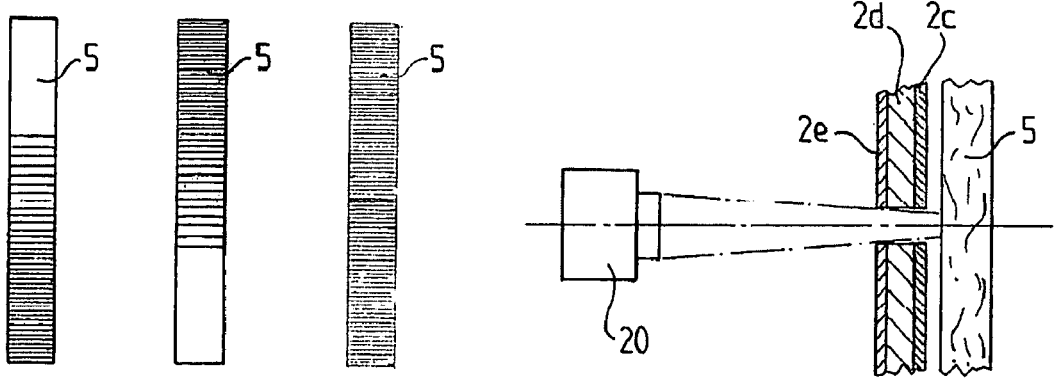

FIGS. 5*a*-5*c* illustrate a stave after treatment and before turning it upside down, the same stave after having turned it upside down, and the same stave after the second treatment, respectively.

FIG. 6 is a partial sectional view of the means for measuring the temperature of the staves during the treatment.

Figure 7:
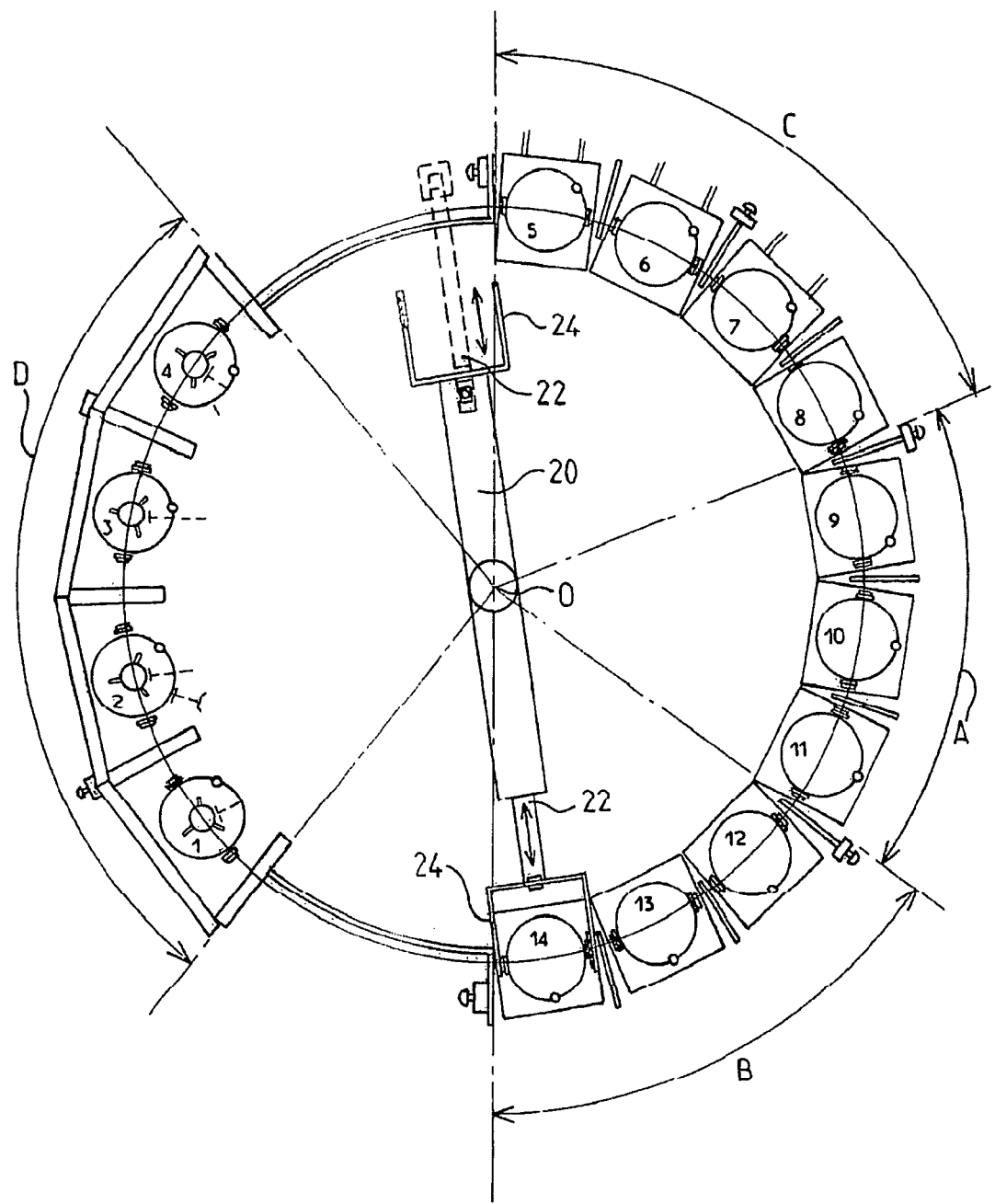

FIG. 7 is a top view of an installation applying treatment modules of the type of those illustrated in FIGS. 1-6.

The device according to the invention which is illustrated in the enclosed FIGS. 1-7, forms a treatment module 1 which essentially comprises a receiving member 2 providing an arrangement and distribution of the wooden staves to be treated 5 along a cylindrical surface of axis yy', at the centre of which a cresset 7 is positioned.

Figure 1:
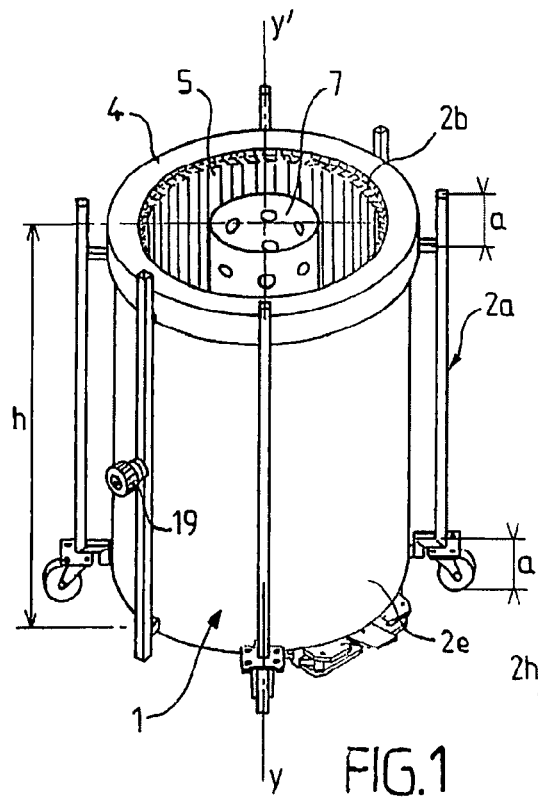
FIG. 1 is a perspective view of a toasting device according to the invention.
Figure 3:
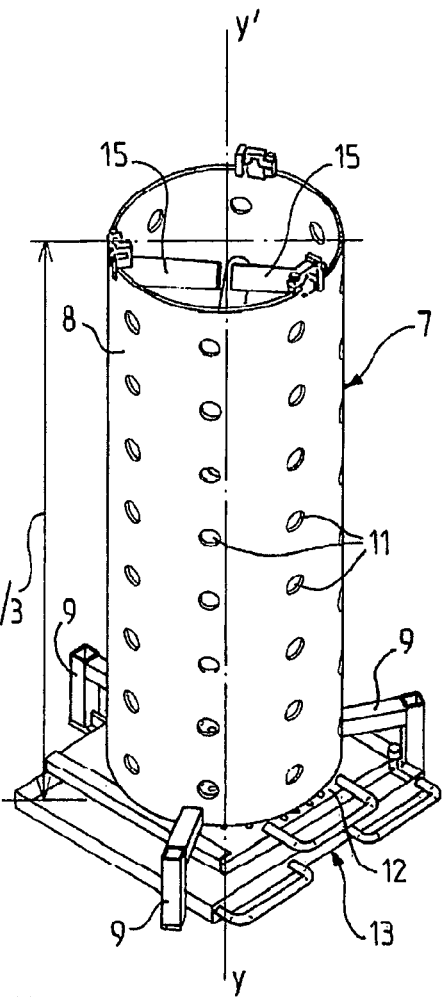
FIG. 3 is a perspective view of a cresset used in the treating device illustrated in FIGS. 1 and 2.
Figure 2:
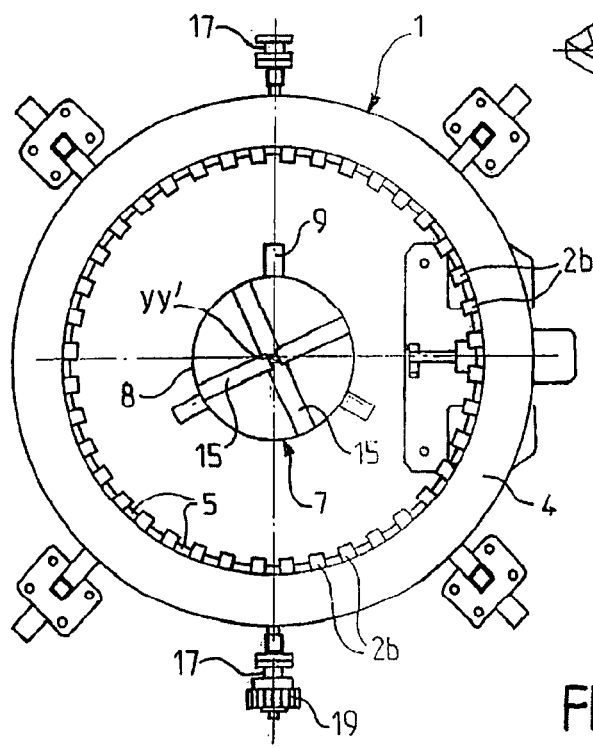
FIG. 2 is a top view of the device illustrated in FIG. 1.
Figure 4:
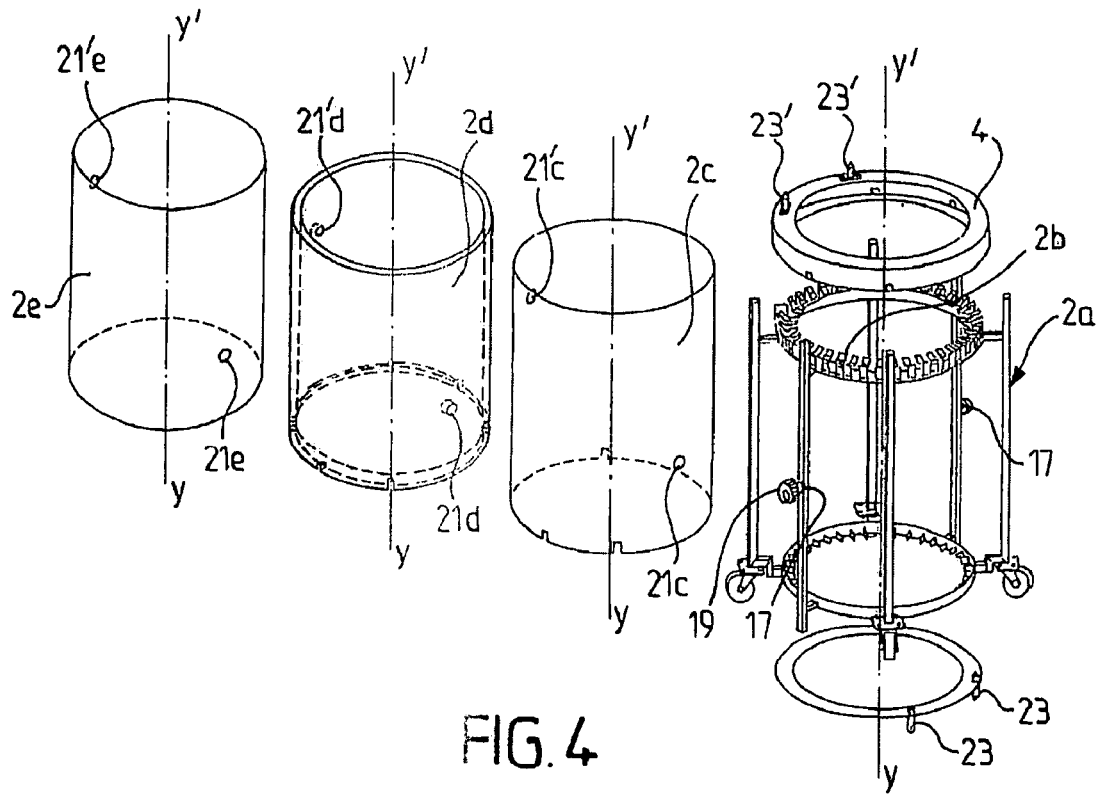
FIG. 4 is an exploded perspective view of the receiving member according to the invention.

The receiving member 2, as illustrated in FIG. 4, consists of a supporting structure 2*a* provided at its upper portion with clips 2*b* with which the staves 5 may be positioned and held according to an arrangement such that the middle plane of each of the staves 5 passes through the central axis yy'. The supporting structure 2a, provides support to an inner metal shroud 2c with a cylindrical shape and with axis yy', which surrounds the staves 5 and which is itself covered with an insulating sleeve 2d, for example in rock wool, the whole ending with an external shroud 2e.

The central cresset 7 is retractable and consists of a metal tubular member 8, held vertically by three legs 9, which is pierced on its periphery with holes for supplying the air 11 for combustion, which are periodically distributed both in the vertical direction and in the horizontal direction.

The lower portion of the cresset 7 is provided with a grid 12 for receiving a combustible product, consisting of wood which may exist under various forms, and notably as platelets, granules or calibrated scraps, and the combustion of which will provide the heat required for heat transformation of the wooden staves 5. A drawer 13 intended to collect the combustion ashes is positioned under the grid 12.

Indexation means are provided with which proper concentric relative positioning of the cresset 7 and of the receiving member 2 may be provided easily and rapidly. Such an indexation may be provided via the ground, and for this purpose, the supporting structure 2a may be provided with lower fingers 23 (and with symmetrical ones 23' after turning it upside down) intended to be positioned in complementary cavities of the ground and, also the cresset 7 will be provided with the same type of marks which may be formed by its legs 9 occupying gully holes provided in the ground.

The heating method used according to the present invention is essential insofar that it proves to be particularly interesting, notably with two considerations, i.e., in that it contributes to the aroma and to the taste delivered by the final product on the one hand, and in that it allows beneficiation of woods on the other hand, which moreover would in fact form waste and which, by themselves, only have very low commercial value.

A difficulty encountered in the effective application of the method and the device according to the invention is to deliver heat, by means of a metal heat source of the cresset type, the distribution thereof being controlled with a distribution profile for example determined according to the height of the staves 5. To provide such a control of the vertical distribution of the heat, transverse metal bars 15 are positioned inside the cresset 7, the role of which bars is to collect heat existing at the centre of the hearth in order to conduct it onto the external walls of the tubular member 8, in the portions of the latter which, during combustion, are found to be less hot. Of course these are notably upper portions of the cresset 7.

These transverse bars 15 thereby play the role of heat distributing members inside the cresset 7 and with which the distribution of heat over the height of the latter may be controlled and the heating profile may be obtained according to the desired height. For this purpose, the bars 15 will be in good thermal contact with the tubular member 8, notably by being welded on the latter. Preferentially, in order to minimize the effects of extension of a wall towards the opposite wall, the transverse bars 15 will be split in their middle forming a gap e between them.

Preferentially, the upper and lower portions of the staves 5 will be covered with two crowns 4a and 4b intended to form a confinement with which heating may be better under control both at the end of the staves and along the thickness of the latter.

During the treatment operation, and in order to provide optimum distribution of the thermal effects on the wood staves 5, means are required with which turning the receiving member 2 by 180°, i.e., upside down, may be performed. Thus, by controlling the heat distribution profile according to the height of the cresset 7, notably by means of control bars 15, the wood is treated during a first heating phase, along a profile which is distributed decreasingly upwards as illustrated in FIG. 5a. Thus, after reversal, a complementary treatment profile is reproduced as illustrated in FIG. 5b, but in the opposite direction, so that the wooden stave is treated throughout its length uniformly, as illustrated in FIG. 5c.

It was noticed that proper distribution of the treatment over the length of a stave 5 to be treated was promoted when the upper portion of the cresset 7 reached about ⅔ of the height h of the receiving member 2.

Application of the method according to the invention may be carried out manually or preferably by automating means. The different steps of the method according to the invention will be described hereafter.

To begin with, the staves 5 will be placed on the supporting structure 2a by attaching them by means of clips 2b. To do this, a first stave 5 will be positioned in contact with a side positioning stop, and then the other staves, which may have widths different from each other, will be positioned in contact with the adjacent staves, each of them being held in position by the clips 2b.

Next, the shells 2c, 2d and 2e followed by the crowns 4a and 4b will be set into place and the cresset 7 will be positioned at centre of the device. After lighting the latter, the first portion of the treatment of the staves 5 will be proceeded with. The supporting structure 2a will then be lifted in order to free it from the cresset 7, and then it will be turned upside down in order to complete the treatment. For this purpose, the supporting structure 2a is provided with two holding members 17 which are intended to be placed in forks of elevator means, not shown in the drawing. One of these members extends radially with a pinion 19 intended to engage with a rotary drive pinion thereby providing the 180° toppling over of the supporting structure 2a. Of course, the cresset 7 may be retracted upwards so as to allow the receiving member 2 to be turned upside down.

The device according to the invention includes means with which monitoring of the temperature assumed by the staves during the heating may be provided. It is understood that when taking into account the arrangement of the latter inside the supporting structure 2a and the presence of the cresset 7, it is extremely difficult to measure temperatures on the front face of the staves during the treatment. According to the invention, it is suggested that such a measurement be provided through the staves 5 themselves. Indeed, by knowing the nature and the thickness of the latter, it is easy, from the temperature of the back of the stave 5 to infer the front temperature of the latter.

Measuring the temperature of the back of a stave 5 is carried out for example by means of an infrared probe. For this purpose, a measuring port, 21c, 21e and 21d, respectively, was provided both in the respective internal and external shrouds 2c and 2e and in the insulating sleeve 2d, through which a measuring probe 20 sends its beam onto the back side of the stave 5 as illustrated in FIG. 6. Of course, a second port, respectively 21'c, 21'e and 21'd, on the same members, is also provided so that after turning the receiving member 2 upside down, the same infrared beam is able to be incident on a back face of a stave 5.

The staves 5 should then be disassembled so as to turn them over from front to back if it is desired that the treatment be carried out through the latter.

Of course, industrially, a simultaneous treatment will be performed on several treatment modules 1 and this by automated means. Such automation means may be very diverse and notably formed by the exemplary embodiment illustrated in FIG. 7 wherein simultaneous treatment of several modules of the type of the one illustrated in FIGS. 1-6 is provided.

These modules 1 are circularly distributed in different work areas corresponding to different determined sectors of centre O, i.e., a loading sector A, an unloading sector B, a stave front-to-back reversal sector C, and a treatment sector D. A diametrical arm 20 is rotatably mounted around the centre O and this arm includes at each of its ends, a secondary arm 22 which is slidably mounted horizontally and vertically within the latter, this arm 22 ending with a U-shaped supporting member 24 able to grasp and to release the receiving members 2 and to perform during the process, their turning over by 180°. It is understood under these conditions that according to its angular position, the arm 20 may grasp each of the receiving members 2 found in the loading area A in order to then bring it into the treatment area D, and then the latter having been performed, into the reversal area B in order to bring it back again into the treatment area D and finally for then delivering it to the unloading area B.

The invention claimed is:

1. A device for treating wooden staves subsequently put into contact with an alcoholic medium, so as to provide the alcoholic medium with aromas and flavors, consisting of a metal support vertically supporting the staves along a cylindrical distribution of axis yy', which is opened at least partially at upper and lower portions of the metal support at the centre of which a cresset is positioned along the axis yy', the cresset having fuel which consists of wood.

2. The device according to claim 1, wherein the metal support includes means capable of supporting the staves such that a middle plane of each of the staves substantially passes through said axis yy'.

3. The device according to claim 1, wherein the cresset extends over a height equal to about two thirds of a height of the metal support.

4. The device according to claim 1, wherein a diameter of the cresset is equal to about one quarter of an internal diameter of the metal support.

5. The device according to claim 1, wherein the cresset includes radial bars welded to an internal wall of the cresset to convey heat from the centre of the cresset towards the internal wall.

6. The device according to claim 1, wherein the metal support and the cresset include indexation means for providing concentric positioning of the cresset with respect to the metal support.

7. An installation for automated treatment of wooden staves by means of the device according to claim 1, wherein the installation comprises a series of said devices positioned along a circle at a centre of which an arm is rotatably mounted, at least one end of which is provided with grasping means for grasping the device with which lifting and turning the metal support upside down is provided.

8. The installation according to claim 7, wherein both ends of the arm are provided with the grasping means.

* * * * *